(12) United States Patent
Fatemi et al.

(10) Patent No.: US 11,817,748 B2
(45) Date of Patent: Nov. 14, 2023

(54) ELECTRIC MACHINE WITH NON-MAGNETIC LAMINATION BRIDGES

(71) Applicant: GM GLOBAL TECHNOLOGY OPERATIONS LLC, Detroit, MI (US)

(72) Inventors: Alireza Fatemi, Canton, MI (US); Anil K. Sachdev, Rochester Hills, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 569 days.

(21) Appl. No.: 16/944,578

(22) Filed: Jul. 31, 2020

(65) Prior Publication Data
US 2022/0037944 A1    Feb. 3, 2022

(51) Int. Cl.
| | |
|---|---|
| H02K 1/30 | (2006.01) |
| H02K 1/02 | (2006.01) |
| H02K 1/27 | (2022.01) |
| H02K 15/03 | (2006.01) |
| H02K 7/00 | (2006.01) |
| H02K 1/276 | (2022.01) |

(52) U.S. Cl.
CPC .............. *H02K 1/30* (2013.01); *H02K 1/02* (2013.01); *H02K 1/276* (2013.01); *H02K 7/006* (2013.01); *H02K 15/03* (2013.01)

(58) Field of Classification Search
CPC ........ H02K 1/30; H02K 7/006; H02K 1/2766; H02K 15/03; H02K 1/02; H02K 1/276; H02K 1/2773

USPC .................................................. 310/216.004
See application file for complete search history.

(56) References Cited

U.S. PATENT DOCUMENTS

| | | | | |
|---|---|---|---|---|
| 4,587,700 | A | * | 5/1986 | Curbishley ............... F01D 5/28 219/121.72 |
| 9,325,220 | B2 | * | 4/2016 | Henderson ............. H02N 15/00 |
| 9,906,083 | B2 | * | 2/2018 | Cao ......................... F04D 25/06 |
| 10,285,594 | B2 | * | 5/2019 | Maeda ............... G01B 9/02091 |
| 10,355,537 | B2 | * | 7/2019 | Zhu ....................... H02K 1/2766 |
| 2010/0247229 | A1 | * | 9/2010 | Kaiser ....................... F16D 1/06 403/14 |

(Continued)

FOREIGN PATENT DOCUMENTS

| | | | | |
|---|---|---|---|---|
| CN | 104685763 | B | * 7/2018 | ........... F04D 25/026 |
| CN | 112425032 | B | * 1/2022 | ............... H02K 1/02 |

(Continued)

*Primary Examiner* — Alex W Mok
(74) *Attorney, Agent, or Firm* — Quinn IP Law

(57) ABSTRACT

A method for constructing a lamination for a rotary electric machine includes forming an annular lamination from a ferrous core material having a first relative magnetic permeability. The lamination defines through-openings, e.g., for permanent magnets or conductors. Peripheral bridges of the core material extend between the through-openings and an outer or inner diameter surface of the lamination. The method includes diffusing an alloy material having a second relative magnetic permeability into the bridges to form austenitic bridges, with the second relative magnetic permeability being less than the first relative magnetic permeability. A rotary electric machine includes a stator and rotor. A vehicle includes a rotary electric machine connected to the battery pack and to road wheels, and having a rotor and/or a stator constructed in accordance with the method.

20 Claims, 4 Drawing Sheets

(56) References Cited

U.S. PATENT DOCUMENTS

| | | | | |
|---|---|---|---|---|
| 2014/0292132 A1* | 10/2014 | Kazmin | ............... | H02K 1/2706 |
| | | | | 310/156.01 |
| 2015/0270751 A1* | 9/2015 | Cao | ...................... | H02K 1/2773 |
| | | | | 310/156.56 |
| 2018/0278100 A1* | 9/2018 | Zhu | ........................ | H02K 15/03 |

FOREIGN PATENT DOCUMENTS

| | | | | |
|---|---|---|---|---|
| JP | 6251816 B2 * | 12/2017 | ............. | H02K 1/276 |
| WO | WO-2020011821 A1 * | 1/2020 | ............... | H02K 1/02 |

* cited by examiner

ELECTRIC MACHINE WITH NON-MAGNETIC LAMINATION BRIDGES

INTRODUCTION

Electric motors, generators, and motor-generator units—collectively referred to in the art as rotary electric machines—typically include a stator that is spaced a short distance apart from a rotor by a radial or axial air gap. In a radial flux-type electric machine, the rotor is coaxially surrounded by the stator, with stator teeth extending radially inward toward the rotor. Adjacent stator teeth are separated from one other by a respective stator slot. Stator windings are formed by filling the stator slots with conductive wires or solid bar conductors. In a polyphase rotary electric machine, an alternating current input voltage is applied to phase leads of the stator windings to energize the stator and thereby generate a rotating stator magnetic field.

Stators and rotors typically use a corresponding lamination stack constructed from multiple layers of a relatively soft ferromagnetic material, e.g., 0.2 mm-0.3 mm thick sheets of electrical steel. The individual layers or "laminations" are coaxially arranged and possibly welded and/or bonded together to form the lamination stack. Cavities are formed by through-openings of adjacent laminations, with the cavities filled by an electrical conductor or a permanent magnet depending on the particular configuration of the lamination stack.

The through-openings of a given lamination may be separated from each other by narrow spans of lamination material. Depending on the location, such spans may be variously referred to as peripheral bridges, radial struts, or transverse ribs. Together, the bridges, struts, and ribs define a web region providing structural support around the through-openings, with each web region typically corresponding to a pole in a finished construction of the rotary electric machine.

SUMMARY

The present disclosure relates to rotary electric machines having non-magnetic or austenitic peripheral bridges, methods for constructing rotor or stator laminations having such bridges, and methods for constructing rotary electric machines using such laminations. As will be appreciated by those of ordinary skill in the art, the individual laminations inclusive of bridges, struts, and other rib structure are punched from thin sheets of electrical steel or other application-suitable ferrous core material. When the laminations are integrated into a finished cylindrical stack, the ribs may act as undesirable flux paths each forming a possible source of magnetic flux leakage. Flux leakage in turn reduces the operating efficiency and peak operating torque of the electric machine.

Accordingly, the present teachings are directed to increasing operating efficiency and peak operating torque in an electric machine by locally alloying the above-noted peripheral bridges, with "peripheral" referring to the location of the bridges in proximity to an inner and/or outer diameter of the laminations. The alloying treatment contemplated herein renders the bridges austenitic at room temperature. In a practical sense, the bridges and possibly an annular inner and/or outer rim formed thereby appear, to an incident magnetic field, more like air and less like the ferrous core material. In other words, the austenitic bridges act as flux barriers and not as flux paths. Such structural properties avoid undesirable short circuiting of the rotor's magnetic field through the treated bridges. Magnetic flux is thus able to more efficiently link with the stator field.

As used herein, the term "non-magnetic" in some embodiments corresponds to a relative magnetic permeability of less than about 10 percent of the relative magnetic permeability of the ferrous core material. For example, when a silicon/electrical steel material having a relative magnetic permeability of 4000 is used to form the individual rotor or stator laminations, the bridges may be locally alloyed to attain a relative magnetic permeability of 400 or less, or 100 or less in other configurations. The values of 4000 and 400 or less are illustrative of possible "magnetic" and "non-magnetic" levels, respectively, and thus are non-limiting unless otherwise specified herein.

According to an embodiment of a method disclosed herein for constructing a lamination for use with a rotary electric machine, the method includes forming an annular lamination from a ferrous core material, e.g., by punching or laser-cutting the lamination from a thin blank or sheet of the core material. The core material has a first relative magnetic permeability $\mu_{R1}$. The lamination, which has an inner and outer diameter surfaces, defines through-openings. The through-openings may be proximate the outer and/or inner diameter surface of the lamination.

The method includes diffusing an alloy material having a second relative magnetic permeability $\mu_{R2}$ into the bridge to form an austenitic bridge, i.e., solely into the bridge without also diffusing into the remaining core material of the lamination. As noted above, $\mu_{R1}$ is greater than $\mu_{R2}$. For instance, $\mu_{R1}$ may be at least 1000 and $\mu_{R2}$ may be less than 100 in a possible implementation, or $\mu_{R1}$ and $\mu_{R2}$ may be at least 4000 and less than 400, respectively.

The annular lamination may include a center bore. Such a center bore defines the above-noted inner diameter surface, which in turn defines an annular inner rim of the lamination. The method may include diffusing the alloy material into the inner diameter surface to form an austenitic inner rim.

In some embodiments, the annular inner rim may include abutting tips of adjacent stator teeth.

The alloy material may include an application-suitable mixture of elements such as manganese and nickel in one possible configuration, with other materials or combinations thereof being possible in other embodiments as described herein.

Diffusing the alloy material may optionally include performing a direct powder injection process or a wire injection process in conjunction with application of heat from a heat source, e.g., a laser beam in a non-limiting embodiment. Diffusing the alloy material may alternatively include using a deposition process prior to a laser treatment process.

In another optional approach, the method may include forming a plurality of the annular laminations from the ferrous core material and coaxially stacking the annular laminations to form a cylindrical rotor or stator stack.

Diffusing the alloy material may occur along an axial length of the stack. For each magnetic pole of the electric machine, diffusing the alloy material may occur continuously between opposing distal ends of the stack, or it may occur non-continuously along the axial length such that, in the latter case, multiple austenitic bridge segments are formed between opposing distal ends of the stack.

A rotary electric machine is also disclosed. In a possible configuration, the electric machine includes a rotor disposed radially within a stator. The rotor includes a coaxial stack of annular rotor laminations, each respective one of which is constructed from a ferrous core material having a first relative magnetic permeability $\mu_{R1}$ and an outer diameter surface. Each rotor lamination defines through-openings proximate the outer diameter surface. A peripheral bridge of the ferrous core material extends between the through-openings and the outer diameter surface to form an annular outer rim.

In this embodiment, at least some of the peripheral bridges are austenitic bridges. That is, the austenitic bridges are constructed using an alloy material having a second relative magnetic permeability $\mu_{R2}$, with the alloy material being diffused into the ferrous core material. As noted above, $\mu_{R1}$ may be at least 10 times greater than $\mu_{R2}$.

Also disclosed herein is a motor vehicle having road wheels and a rotary electric machine, the latter of which is connected to a battery pack and one or more of the road wheels. The electric machine includes a rotor disposed radially within a stator having annular stator laminations, with the rotor having a coaxial stack of annular rotor laminations. At least some of the peripheral bridges and/or an annular inner rim of the stator are constructed from electrical steel and an alloy material having a relative magnetic permeability, e.g., of less than 100 in this particular non-limiting embodiment. The stator may be similarly configured, e.g., with stator tips of adjacent stator teeth being locally alloyed with the same or a similar alloy material.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
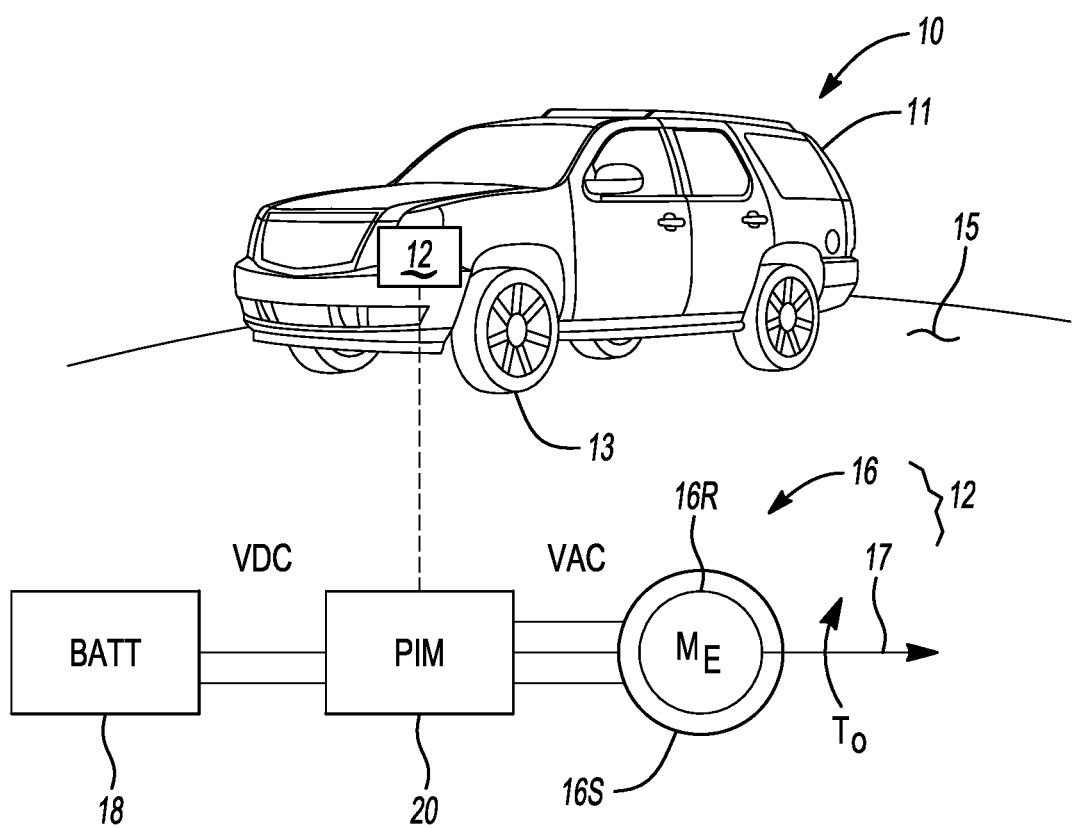
FIG. 1 is a schematic exploded perspective view illustration of an electric powertrain having a rotary electric machine constructed as set forth herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a vehicle 10 is depicted schematically in FIG. 1 as a non-limiting exemplary system having an electric powertrain 12. In the illustrated configuration, the vehicle 10 may be variously embodied as a hybrid electric vehicle or a battery electric vehicle having a vehicle body 11 and road wheels 13, e.g., four road wheels 13 in the illustrated motor vehicle configuration, or more/fewer road wheels 13 in other embodiments.

The electric powertrain 12 may be used in the illustrated embodiment to propel the vehicle 10 along a road surface 15 by delivering motor output torque (arrow $T_O$) from a rotary electric machine ($M_E$) 16 to one or more of the road wheels 13. Portions of such an electric machine 16 may be locally alloyed in accordance with the present teachings as set forth below with reference to FIGS. 2-6. While the vehicle 10 is depicted as a motor vehicle in FIG. 1 for illustration, the present teachings may be applied to other mobile systems, e.g., watercraft, aircraft, spacecraft, rail vehicles, robots, construction equipment, farm equipment, etc. Likewise, the electric powertrain 12 may be used as part of a powerplant, hoist, or other stationary system, and thus the motor vehicle 10 of FIG. 1 is representative of just one possible application.

The electric machine 16 includes a rotor 16R that is positioned with respect to a stator 16S. The rotor 16R may be variously configured as a radial flux-type interior permanent magnet motor, induction motor, or another synchronous or asynchronous machine. As described below, specific portions of the rotor 16R and/or stator 16S are treated in accordance with the disclosure to diffuse targeted portions thereof with non-magnetic alloys. The resultant construction may help to minimize flux leakage through undesirable flux paths and thereby increase average peak torque.

An output member 17 of the rotor 16R, e.g., a rotor shaft, is connectable to a driven load, which in the non-limiting FIG. 1 embodiment includes one or more of the road wheels 13 as noted above. Such torque (arrow $T_O$) may be transmitted to a transmission (not shown) of the vehicle 10, either alone or in conjunction with engine torque (not shown) depending on the configuration of the vehicle 10. When the electric machine 16 is embodied as a polyphase device as shown, phase windings of the stator 16S are electrically connected to a power inverter module (PIM) 20 via an AC voltage bus (VAC). The PIM 20 in turn is connected to a high-voltage battery pack (BATT) 18 via a DC voltage bus (VDC). The electric powertrain 12 may include additional components not described herein but well understood in the art, e.g., a low/auxiliary voltage bus and one or more auxiliary devices connected thereto, a DC-DC converter and auxiliary battery, etc.

Figure 2:
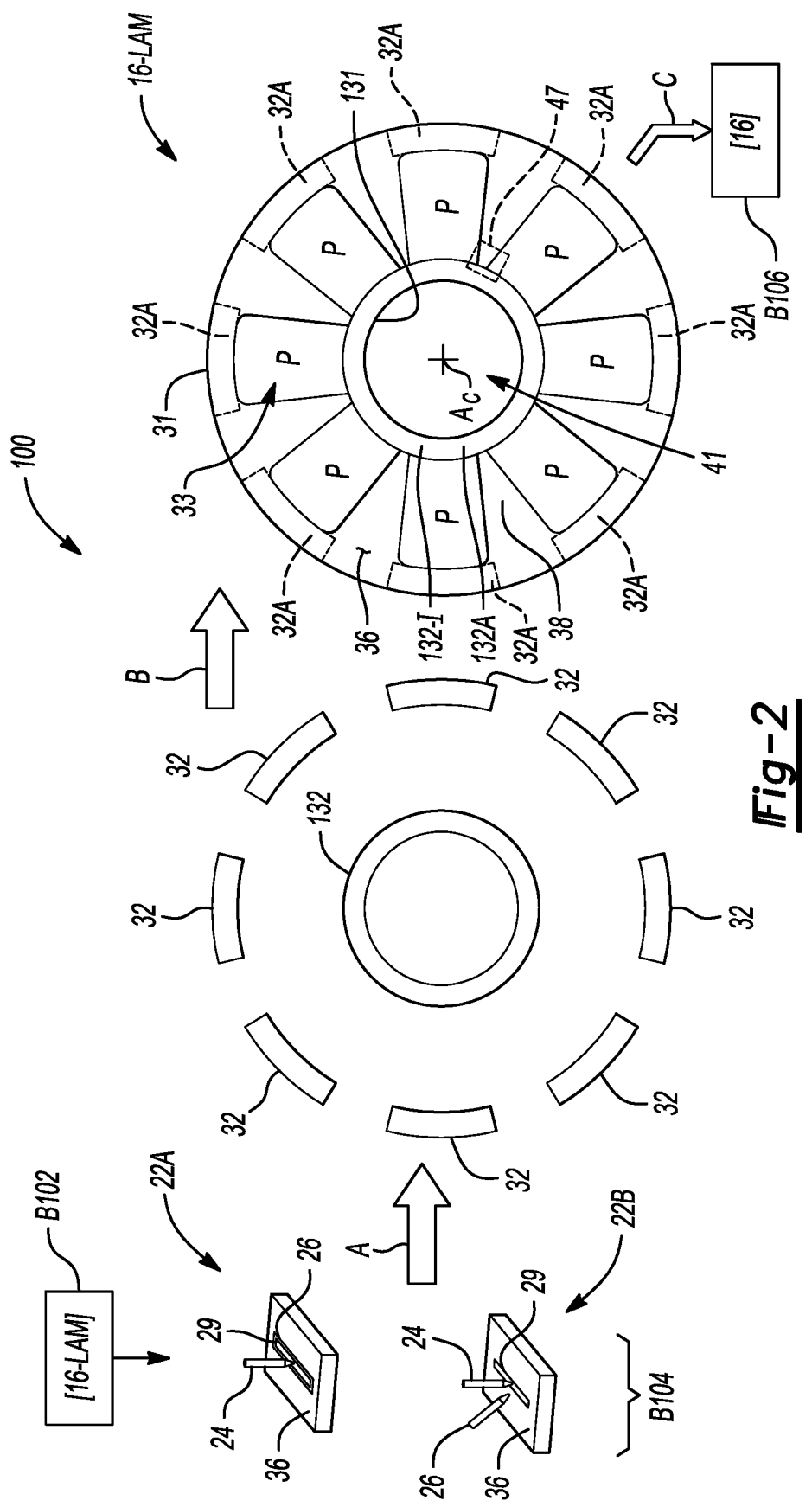
FIG. 2 is a schematic illustration of a representative process for forming laminations or a stack thereof in accordance with the disclosure.

Referring to FIG. 2, a method 100 is depicted schematically for constructing a lamination 16-LAM for use with the rotary electric machine 16 of FIG. 1. The method 100 may be used to construct the stator 16S and/or the rotor 16R of FIG. 1, with the particular non-limiting embodiment shown in FIG. 2 being configured for use with the rotor 16R. An exemplary lamination 316-LAM configured for use with the stator 16S is described below with particular reference to FIG. 6.

The method 100 of FIG. 2 according to a possible embodiment includes, at block B102, forming the annular rotor lamination 16-LAM from a ferrous core material 36. For example, a given annular rotor lamination 16-LAM may be formed by punching or laser cutting sheet metal blanks, e.g., 0.20 mm-0.30 mm thick blanks of electrical steel, cobalt steel, or other application-suitable ferrous metal having a high relative magnetic permeability, with "high relative magnetic permeability" being, for instance, 1000-4000 or possibly more. The rotor lamination 16-LAM is annular, i.e., ring-shaped, and thus has an inner diameter surface 131 and an outer diameter surface 31.

As shown in FIG. 2, the lamination 16-LAM defines multiple narrow peripheral bridges 32 disposed around a center axis Ac of the lamination 16-LAM. In the illustrated configuration, the peripheral bridges 32 are in close proximity to the outer diameter surface 31, i.e., the circular outer periphery of the illustrated lamination 16-LAM. In general, each peripheral bridge 32 lies within a respective magnetic pole of the rotor 16R when the lamination 16-LAM is used as part of the rotor 16R. As noted above, an exemplary embodiment is described below with reference to FIG. 6 in which the lamination 16-LAM is used as part of the stator 16S.

Figure 3:
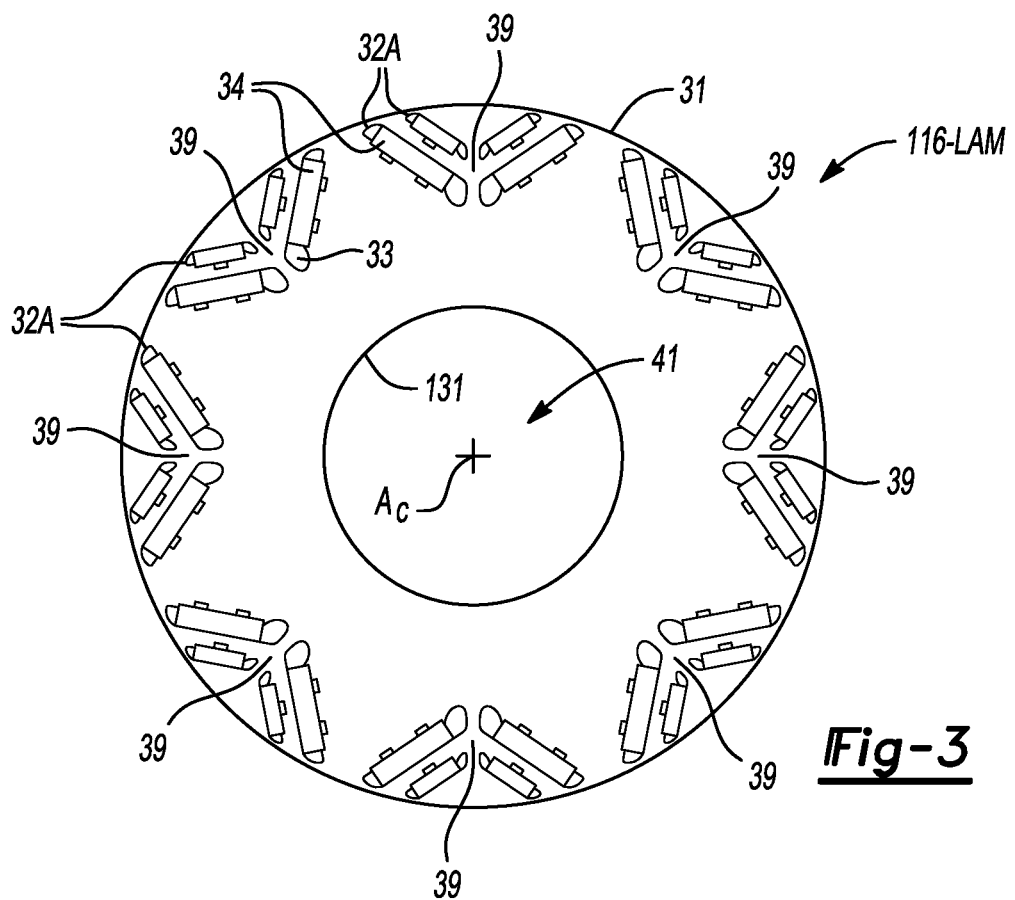
FIGS. 3 and 4 are plan view illustrations of two possible embodiments.
Figure 4:
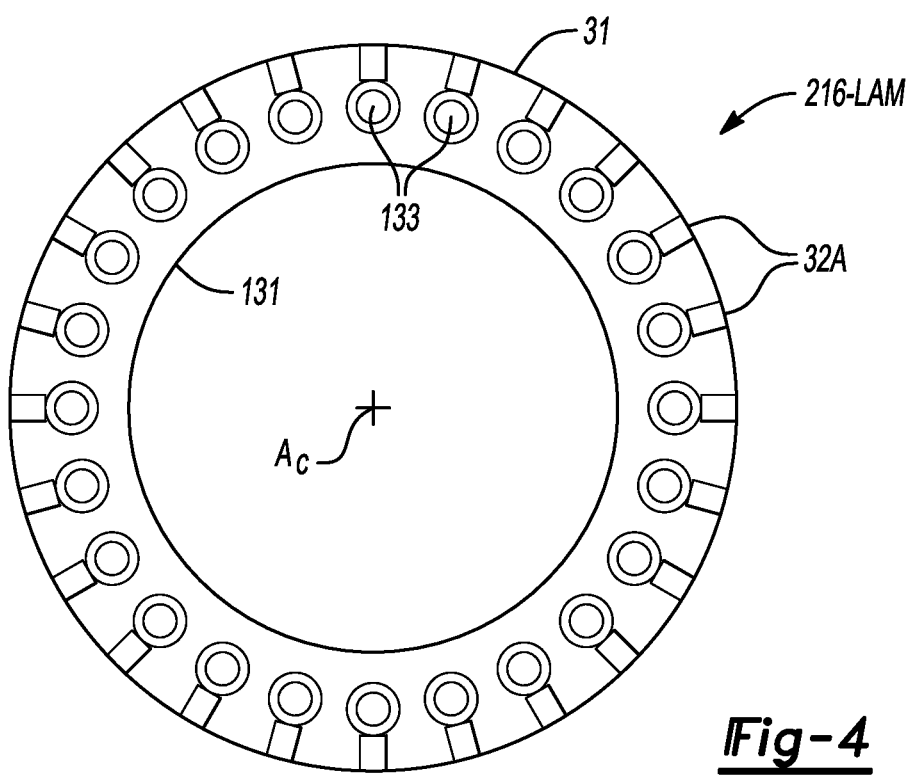

Each lamination 16-LAM defines a plurality of through-openings 33 proximate the outer diameter surface 31, with the through-openings 33 individually labeled "P" for clarity to indicate that the through-openings 33 are punched or otherwise cut or separated from ferrous core material 36 as part of block B102. The peripheral bridges 32 constructed primarily of the ferrous core material 36 extend between the through-openings 33 and the outer diameter surface 31 in this embodiment. The shape, number, and arrangement of through-openings 33 will vary with the construction of the lamination 16-LAM, with one or more magnets or electrical conductors (not shown) possibly filling a void collectively defined by stacking several adjacent rotor laminations 16-LAM. For instance, interior permanent magnet (IPM) configurations are depicted in FIGS. 2, 3, and 5, while an induction motor embodiment is depicted in FIG. 4.

The method 100 includes, at block B104, diffusing an application-suitable alloy material 26 into the ferrous core material 36 of the peripheral bridge 32 to thereby form an austenitic bridge 32A. The ferrous core material 36 and the alloy material 26 have respective first and second relative magnetic permeabilities, i.e., $\mu_{R1}$ and $\mu_{R2}$. In the various embodiments, $\mu_{R1}$ is greater than $\mu_{R2}$, with diffusion of the alloy material 26 into the peripheral bridge 32 rendering a given bridge 32 austenitic relative to properties of the remaining core material 36. Thus, when the core material 36 has a relative magnetic permeability of 1000 or more, the resulting austenitic bridge 32A may have a relative magnetic permeability of less than 100 in a possible embodiment.

Figure 5:
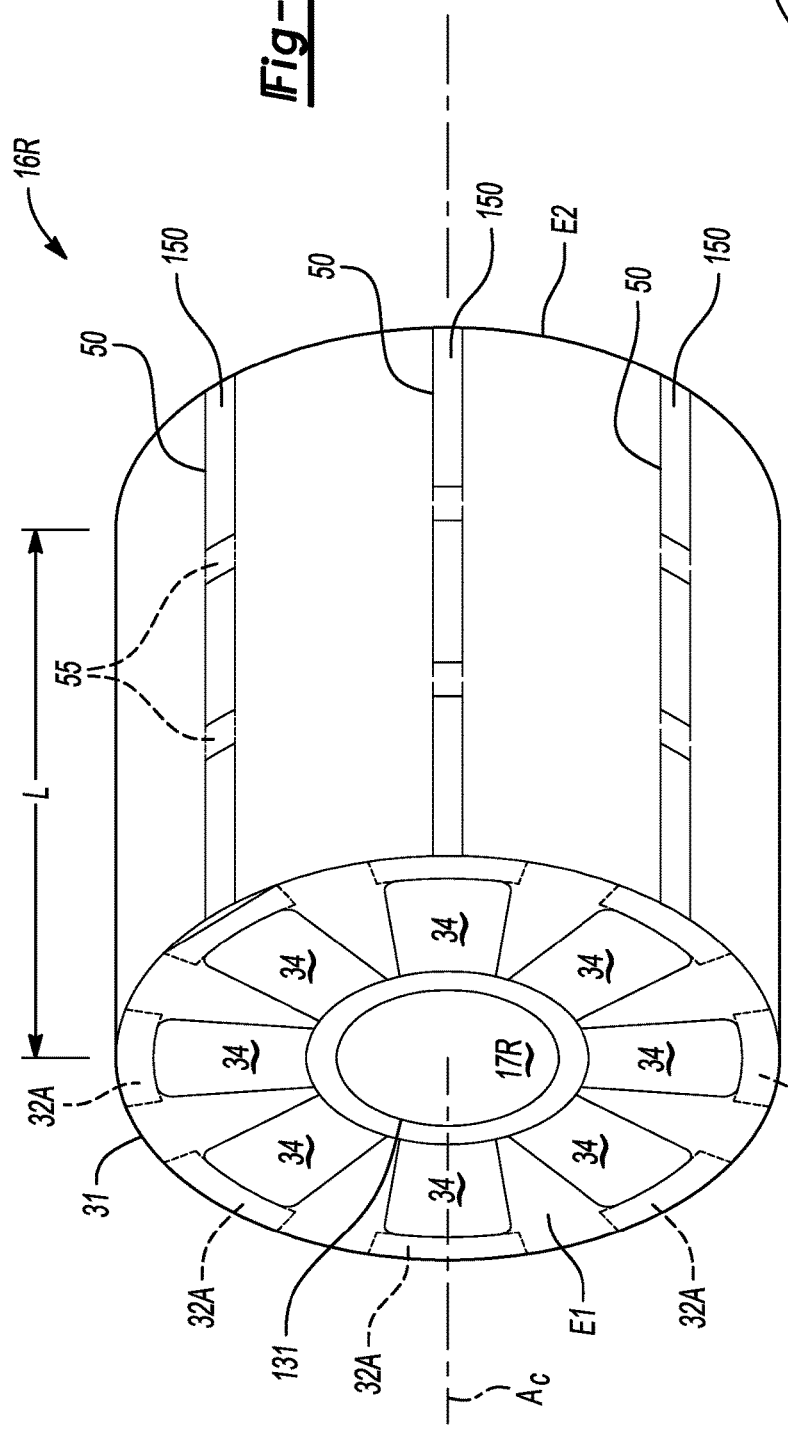
FIG. 5 is a schematic perspective view illustration of an exemplary rotor constructed according to embodiments of the present method.

As part of block B104, the method 100 may include coaxially-stacking an application-suitable quantity of the laminations 16-LAM to form a stack, e.g., stack 19 of FIG. 5. Alternatively, the alloying process described herein may be conducted individually on each rotor lamination 16-LAM prior to assembling an application-specific number of such laminations 16-LAM into such a stack 19.

A possible approach includes melting local surfaces of the peripheral bridges 32 to form a melt pool 29 before introducing the alloy materials 26 to the melted local surface. Shown as process 22A in FIG. 2, for instance, a pre-placed coating process may be used in which the alloy material 26 is applied as a paste, foil, or powder to a targeted area of the lamination 16-LAM, in this case the bridges 32. The alloy material 26 and surrounding material of the lamination 16-LAM are then fused via heat from an incident heat source 24, such as a laser beam, infrared energy beam, and/or induction heating, to form the austenitic bridges 32A.

Figure 6:
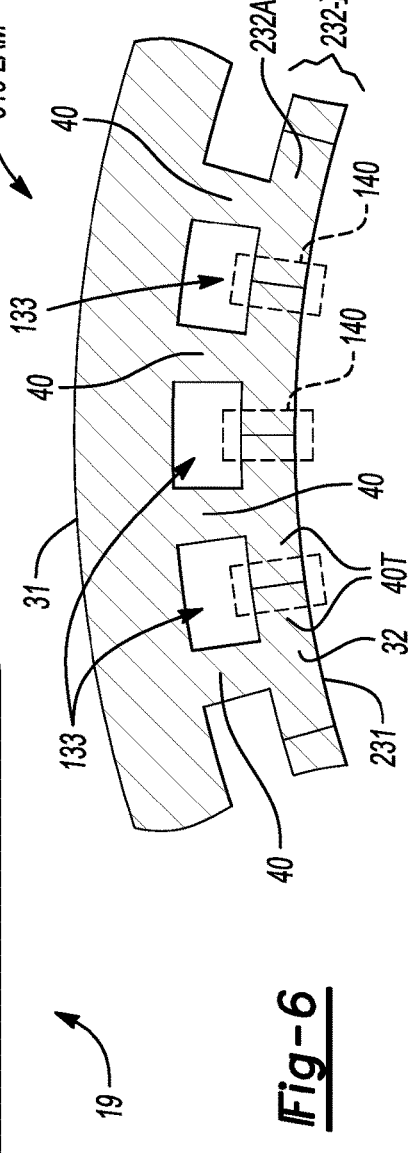
FIG. 6 is a schematic cross-sectional illustration of an exemplary stator lamination configured in accordance with the disclosure.

The annular lamination 16-LAM of FIG. 2 includes a center bore 41. When the lamination 16-LAM serves as an integral part of the rotor 16R shown in FIG. 1, the center bore 41 is configured to receive a rotor shaft 17R (see FIG. 5) therein, as will be appreciated by those of ordinary skill in the art. Alternatively, the lamination 16-LAM may be part of the stator 16S as shown in FIG. 6, in which case the center bore 41 is configured to receive the rotor 16R therein, as will be appreciated by those skilled in the art.

The center bore 41 may define an annular inner rim 132-I (FIG. 2) or 232-I (FIG. 6) having a respective inner diameter surface 131 or 231. In addition to treatment of the bridges 32, the method 100 may include diffusing the alloy material 26 into portions of the inner diameter surface 131 to form an austenitic inner rim 132A (FIG. 2) or 232A (FIG. 6). The inner rim 132-I or 232-I could be made austenitic around its entire circumference, or segments of the inner rim 132-I or 232-I may be treated. Treating less than the entire circumference of the inner rim 132-I or 232-I may be performed, e.g., to minimize the costs associated with the alloying process. In such a case, a root 47 in proximity of radial lamination spokes 38 may be locally alloyed, with the root 47 in this instance being a contiguous area of the radial lamination spokes 38 and the inner rim 132-I.

Alternatively as shown as process 22B in FIG. 2, the alloy material 26 may be fed into the melt pool 29 at the time of treatment, e.g., by a direct powder injection or wire injection process. The alloy material 26 could be deposited by thermal spraying or diffusion coating, sputtering, or another suitable deposition process such as ink jet printing or pattern screening, prior to laser treatment, to locally alter the chemistry of the bridges 32. Upon cooling, the local area is austenitic in nature. Such a process could be performed before or after punching out the through-openings 33.

Various materials and treatment processes may be used within the scope of the disclosure. For example, one may diffuse one or more elements, such as at least one or more of nickel, manganese, chromium, molybdenum, or carbon, i.e., as single elements or as combinations of different elements, onto/into the core material 36 defining the peripheral bridges 32. A combination of manganese and nickel, e.g., 3-25% by weight, may be used in a particular embodiment.

As indicated by the progression of arrows A and B in FIG. 2, the result of the alloying process(es) is one or more laminations 16-LAM having austenitic bridges 32A and/or the austenitic inner rim 132A. When individually treating the laminations 16-LAM, e.g., with a laser beam embodiment of the heat source 24, the axis of the laser beam is perpendicular to the plane of the lamination 16-LAM. The stack 19 of FIG. 5 or variations thereof could be treated after constructing the stack 19 in other embodiments. In such a case, the axis of the laser beam will be parallel with the lamination plane, i.e., the laser beam irradiates an edge of the lamination 16-LAM.

At block B106 of FIG. 2, as indicated by the progression of arrow C, the stack 19 constructed of an application-suitable number of laminations 16-LAM may be assembled and thereafter integrated with the stator 16S or rotor 16R, respectively, to construct the rotary electric machine 16 of FIG. 1.

Referring briefly to FIG. 5, block B104 of FIG. 2 may include forming a plurality of the annular laminations 16-LAM from the ferrous core material 36 and coaxially stacking the annular laminations 16-LAM to form a lamination stack, e.g., stack 19. Diffusion of the alloy material 26 may occur along an axial length L of the stack 19 after coaxially stacking the annular laminations 16-LAM. The method 100 may include diffusing the alloy material 26 continuously between opposing distal ends E1 and E2 of the stack 19 to form a continuous austenitic axial bridge 50. Alternatively, diffusion of the alloy material 26 may occur non-continuously along the axial length L of the stack 19, such that multiple austenitic axial segments 150 are formed between the opposing distal ends E1 and E2.

Once formed in this manner, the method 100 may include constructing the electric machine 16 of FIG. 1. When constructing the rotor 16R, for instance, subsequent processes may include inserting permanent magnets (not shown) into the through-openings 33 in an IPM construction, if such an installation has not already transpired prior to processes 22A or 22B. Alternatively, conductors may be inserted into the through-openings 33 in the induction machine embodiment of FIG. 4. When the laminations 16-LAM are used to construct the stator 16S, e.g., as shown in FIG. 6, the through-openings 133 may be filled with stator windings (not shown). After the rotor 16R and/or stator 16S are constructed in this manner, the rotor 16R may be disposed radially within a stator 16S of FIG. 1, with the constructed electric machine 16 thereafter connected to a driven load and power supply, such as the road wheels 13 and battery pack 18/PIM 20.

As noted above, the laminations 16-LAM could be treated at the stack level on the outer diameter and/or inner diameter surfaces 31 and/or 131, respectively. The corresponding peripheral bridges 32 and/or inner rim 132 or stator teeth 40 (FIG. 6) abut one another such that, from the perspective of FIG. 5, the abutted and adjacent bridges 32 collectively form the continuous austenitic axial bridge 50 (FIG. 5) extending from one distal end E1 to the other distal end E2. Alternatively, the multiple axial austenitic axial bridge segments 150 may be separated from each other by untreated bridge segments 55, e.g., to reduce losses when the laminations 16-LAM are alloyed at the level of the stack 19. Interposition of the untreated axial bridge segments 150 adds resistance to conductive paths possibly followed by eddy currents, with a larger number of axial bridge segments 150 of shorter lengths possibly lowering eddy current losses.

Once the stack 19 has been assembled, the above-described direct powder injection or preplaced adherent coating processes 22A and 22B of FIG. 2 could be used to form the continuous austenitic axial bridge 50 or the axial bridge segments 150. In each case, the inner diameter surface 131 may be optionally treated in the same manner. If untreated, it may be advantageous to enlarge the bridges 32 to enable the bridges 32 to better carry stress and support the rotor lamination 16-LAM.

As noted above, alternative configurations of the exemplary lamination 16-LAM of FIG. 2 having austenitic bridges 32A are respectively depicted as laminations 116-LAM and 216-LAM in FIGS. 3 and 4, in which the laminations 116-LAM and 216-LAM are used as part of the rotor 16R shown in FIG. 1. In FIG. 3, for instance, the present teachings may be applied to V-shaped arrangements of permanent magnets 34 disposed within the through-openings 33. As will be appreciated by those of ordinary skill in the art, an IPM rotor configuration may form rotor magnetic poles in a suitable shape and arrangement, e.g., using block magnets, or a "single-V" or "dual-V" arrangements of flat/rectangular bar magnets located adjacent to the outer diameter surface 31. The angular orientation or "V-angle" of the arranged rotor magnets may open toward the outer diameter surface of the rotor 16R in a typical magnet configuration. Ideally, struts 39 or other surrounding rib structure ordinarily present radially-inward from the bridges 32 around the periphery of the lamination 16-LAM may be eliminated to further optimize peak torque capabilities, or other techniques may be used to treat such struts 39 to render the struts non-magnetic.

With respect to FIG. 4, the present teachings may be extended to lamination 216-LAM as an induction configuration, with circular through-openings 133. As will be appreciated, such a construction foregoes use of permanent magnets. Instead, the through-openings 133 form outer rings that are filled with electrical conductors (not shown). In such an embodiment, the austenitic bridges 32A remain adjacent to the outer diameter surface 31 as shown, with alloying treatment of the laminations 216-LAM proceeding in the manner set forth above.

Referring to FIG. 6, the present teachings may be extended to minimizing flux leakage in the stator 16S of FIG. 1. The through-openings 133 are defined in part by the inner rim 232-I, with stator teeth 40 extending radially therebetween. As will be appreciated by those of ordinary skill in the art, the stator teeth 40 may terminate in tips 40T, such that each of the stator teeth 40 has a T-shaped cross-section as shown. In a possible embodiment, the tips 40T of an adjacent pair of stator teeth 40 abut and contact one another to further define the through-openings 133. The peripheral bridges 32 in this case may include surface area 140 in proximity to the abutted pair of the stator teeth 40. That is, treated portions of the austenitic inner rim 232A formed in this embodiment include at least the adjoining or abutted surfaces of the tips 40T, or the entire inner rim 232-I in other embodiments.

As will be appreciated by those of ordinary skill in the art in view of the foregoing disclosure, the present teachings enabled a rotor 16R and/or a stator 16S of an electric machine 16, e.g., as shown in FIG. 1, to be rendered locally non-magnetic by diffusing alloy materials 26 into targeted regions of the core ferrous material 36, specifically the peripheral bridges 32 and/or possibly the inner rim 132-I (FIG. 2) and/or 232-I (FIG. 6) as described above. The disclosed method 100 is suitable for reducing or eliminating leakage of magnetic flux through the targeted structural regions. Use of the present approach does not compromise the structural integrity of the core ferrous material 36. That is, the diffusion of the alloy materials 26 into the targeted areas is characterized by the absence of ceramic or other masking materials prior to heat treating, which would otherwise have to be stripped off and disposed of prior to stack construction. These and other benefits will be readily appreciated by those of ordinary skill in the art in view of this disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for constructing an annular lamination for a rotary electric machine, the method comprising:

forming the annular lamination from a ferrous core material having a first relative magnetic permeability, wherein the annular lamination defines a plurality of through-openings, such that a peripheral bridge of the ferrous core material extends between the through-openings and a perimeter surface of the annular lamination; and diffusing an alloy material having a second relative magnetic permeability that is less than the first relative magnetic permeability into the peripheral bridge to thereby form an austenitic bridge, wherein diffusing the alloy material includes (i) performing a direct powder injection process or a wire injection process in conjunction with application of heat from a heat source, or (ii) using a deposition process prior to a laser treatment process.

2. The method of claim 1, wherein the first relative magnetic permeability is at least 1000 and the second relative magnetic permeability is less than 100.

3. The method of claim 1, wherein the annular lamination includes a center bore defining an inner diameter surface as the perimeter surface, the method further comprising: diffusing the alloy material into the inner diameter surface to thereby form an austenitic inner rim.

4. The method of claim 1, wherein the alloy material includes at least one of: nickel, manganese, chromium, molybdenum, or carbon.

5. The method of claim 4, wherein the alloy material is a mixture of manganese and nickel.

6. The method of claim 1, wherein diffusing the alloy material includes performing the direct powder injection process or the wire injection process in conjunction with the application of heat from the heat source.

7. The method of claim 6, wherein the heat source includes a laser beam.

8. The method of claim 1, wherein diffusing the alloy material includes using the deposition process prior to a laser treatment process.

9. The method of claim 1, further comprising:
forming a plurality of the annular laminations from the ferrous core material; and
coaxially stacking the annular laminations to form a lamination stack.

10. The method of claim 9, wherein diffusing the alloy material occurs along an axial length of the lamination stack after coaxially stacking the annular lamination.

11. The method of claim 10, wherein diffusing the alloy material occurs continuously between opposing distal ends of the lamination stack.

12. The method of claim 10, wherein diffusing the alloy material occurs non-continuously along the axial length of the lamination stack, such that multiple austenitic axial segments are formed between opposing distal ends of the lamination stack.

13. The method of claim 1, wherein the annular lamination is a stator lamination having a plurality of stator teeth, each respective one of which has a corresponding abutted pair of the stator teeth, and the peripheral bridge includes a surface of the abutted pair of the stator teeth.

14. A rotary electric machine comprising:
a stator; and
a rotor disposed radially within the stator and having:
a coaxial lamination stack of annular rotor laminations, each respective one of the rotor laminations being constructed from a ferrous core material having a first relative magnetic permeability and an outer diameter surface, such that the rotor lamination defines a plurality of through-openings proximate the outer diameter surface, wherein a peripheral bridge of the ferrous core material extends between each of the through-openings and the outer diameter surface;
wherein at least some of the peripheral bridges are austenitic bridges constructed at least partially from an alloy material having a second relative magnetic permeability, the alloy material being diffused into the ferrous core material non-continuously along an axial length of the coaxial lamination stack such that multiple austenitic axial segments are present between opposing distal ends of the coaxial lamination stack, and wherein the first relative magnetic permeability is at least 10 times greater than the second relative magnetic permeability.

15. The rotary electric machine of claim 14, wherein the annular rotor laminations include a respective center bore configured to receive a rotor shaft therein and defining an austenitic rim, each respective center bore defining an inner diameter surface diffused with the alloy material to form the austenitic rim.

16. The rotary electric machine of claim 14, wherein the stator includes a coaxial stack of annular stator laminations constructed from the ferrous core material and having a plurality of T-shaped stator teeth, the ends of which abut respective ends of an adjacent pair of the stator teeth, and wherein the ends of the T-shaped stator teeth are alloyed with the alloy material.

17. The rotary electric machine of claim 14, wherein some of the peripheral bridges do not include the alloy material.

18. The rotary electric machine of claim 14, wherein the rotor is an interior permanent magnet rotor or an induction rotor.

19. The rotary electric machine of claim 14,
wherein the rotary electric machine is connected to a battery pack and to one or more road wheels of a vehicle.

20. A method for constructing annular laminations for a rotary electric machine, the method comprising:
forming the annular laminations from a ferrous core material having a first relative magnetic permeability, wherein the annular laminations each have a perimeter surface and define a plurality of through-openings, such that a peripheral bridge of the ferrous core material extends between the through-openings and the perimeter surface;
coaxially stacking the annular laminations to form a lamination stack; and
diffusing an alloy material having a second relative magnetic permeability into the peripheral bridge of each respective one of the annular laminations to thereby form an austenitic bridge, including diffusing the alloy material non-continuously along an axial length of the stack such that multiple austenitic axial segments are formed between opposing distal ends of the lamination stack, wherein the second relative permeability is less than the first relative magnetic permeability.

* * * * *